US007376965B2

(12) United States Patent
Jemes et al.

(10) Patent No.: US 7,376,965 B2
(45) Date of Patent: May 20, 2008

(54) SYSTEM AND METHOD FOR IMPLEMENTING A BUBBLE POLICY TO ACHIEVE HOST AND NETWORK SECURITY

(75) Inventors: Brian Jemes, Moscow, ID (US); John Melvin Brawn, San Jose, CA (US); Leif Buch-Pedersen, St. Martin d'Uriage (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 834 days.

(21) Appl. No.: 09/861,986

(22) Filed: May 14, 2001

(65) Prior Publication Data

US 2002/0099823 A1 Jul. 25, 2002

Related U.S. Application Data

(60) Provisional application No. 60/204,229, filed on May 15, 2000.

(51) Int. Cl.
*G06F 15/177* (2006.01)
*G06F 15/173* (2006.01)

(52) U.S. Cl. .................... 726/3; 709/220; 709/221; 709/222; 709/223; 709/224; 709/225

(58) Field of Classification Search ........ 713/150–154, 713/200–201; 209/213, 214, 217–230, 238–239, 209/248–250; 710/1–4, 15–18; 707/1–2, 707/9–10; 709/220–230, 249
See application file for complete search history.

(56) References Cited

U.S. PATENT DOCUMENTS

| | | | | | |
|---|---|---|---|---|---|
| 5,692,124 | A | * | 11/1997 | Holden et al. | 713/201 |
| 6,076,168 | A | * | 6/2000 | Fiveash et al. | 713/201 |
| 6,085,084 | A | * | 7/2000 | Christmas | 455/411 |
| 6,219,786 | B1 | * | 4/2001 | Cunningham et al. | 713/152 |
| 6,308,205 | B1 | * | 10/2001 | Carcerano et al. | 709/221 |
| 6,738,908 | B1 | * | 5/2004 | Bonn et al. | 713/201 |

* cited by examiner

*Primary Examiner*—Kim Vu
*Assistant Examiner*—Ponnoreay Pich (57) ABSTRACT

A method of creating a structured access list template, which includes dividing an access list template into a plurality of sections, creating an inbound local rule group for the bubble, creating an outbound local rule group for the bubble, creating an inbound remote rule group for the bubble, and creating an outbound remote rule group for the bubble. A method of creating an access list for each of the plurality of bubble boundary devices, which includes creating an address table that includes a plurality of addresses corresponding to devices in a bubble partition, creating a protocol table that includes a list of network services and whether each of the network services are granted or denied access to the bubble partition, creating an access list template using the address table and the protocol table, generating an access list from the access list template, and providing the access list to one of the plurality of bubble boundary devices.

10 Claims, 5 Drawing Sheets

SYSTEM AND METHOD FOR IMPLEMENTING A BUBBLE POLICY TO ACHIEVE HOST AND NETWORK SECURITY

CROSS-REFERENCE TO RELATED APPLICATION

This application claims priority from U.S. provisional patent application Ser. No. 60/204,229, filed May 15, 2000, which is herein incorporated by reference for all purposes.

BACKGROUND OF THE INVENTION

1. Field of the Invention

The present invention relates particularly to systems and methods for providing host and network security and, more particularly to systems and methods for implementing a bubble policy to achieve host and network security.

2. Description of the Related Art

Company networks are vulnerable to numerous network attacks. Network firewalls or similar approaches are typically utilized by companies to mitigate the risk of such attacks. Several types of devices have been developed that perform network firewall functions. One commonly known device is a router, which is a device that determines the next network point to which a packet of information is to be delivered. Before the packet is forwarded to another device, the router may use an access list that provides conditions or rules to determine whether the packet has access to the particular destination. For most network firewalls, the rules typically consist of a test criteria and an action. The network firewall determines whether the test criteria matches and then the corresponding action is performed, whether it is a permit or a deny. In addition, these devices may provide functions such as user authentication. Also, application proxies, e.g., socks and caching web proxies, allow specific applications to be executed for network security and might also employ user authentication.

Constructing an access list is a complex task. There are specific access control rules that are associated with an address range and other protocol fields and session states. It is also common for the rules to follow an order of precedence. A common order of precedence is that the action performed will be the one specified by the first rule that matches the packet. Therefore, the ordering of access list rules must be performed carefully.

Companies typically have a network security policy that describes the type of access that should be permitted through firewall devices. This policy is achieved through the application of a combination of the network firewall devices described above. One common network security model implemented by many companies is the concept of dividing the networks into three categories: internal, external, and De-Militarized Zone (DMZ). This type of network security policy is defined by the access permitted between these network categories. That is, the network firewall is made up of devices that provide the interconnections between these network categories. The network firewall is located at a network control point, which is located between the internal network and the external network, e.g., the public Internet, and at any direct links to other companies. End-user hosts and internal servers are part of the internal network. The public Internet and other company networks are part of the external network. Web servers, email servers and other application servers that require general connectivity with the external network are part of the DMZ.

A common network security policy may be that internal systems are permitted to create connections to the external networks, but connections from the external network to the internal network are not permitted, unless they are accompanied by user authentication. In addition, the DMZ hosts are permitted to have connectivity to the external networks and the internal networks independently, but are not permitted to have "pass-through" connectivity from the external networks to the internal networks. An exception to the common network security policy might be configured into the network firewall when, for example, a DMZ or external network may have a particular user or host that must be permitted access to a particular host in the internal network.

Protecting information resources involves a complex array of technologies such as application security, host security, network security, physical security, data network transport path security, data confidentiality rating and user classification groups. In large companies, the effort to protect information resources is uncoordinated resulting in many employees independently working on different security technologies. For example, there are two categories of hosts that are most aware of network security. First, a bastion host has one interface facing the external networks and one interface facing the internal networks. A bastion host does not require any network protection on the external interface so it does not rely on the company network firewall. Second, a DMZ host, which resides in the DMZ, has a greater risk of attacks and therefore also does not rely on the company network firewall. For example, a DMZ host may have insufficient host security and may allow attacks to other hosts in the same network. These attacks may be allowed because the enterprise network firewall assumes that a stronger level of host security exists on all DMZ hosts.

Another drawback of trying to balance host security and network security is that it is an all or nothing approach. This is because hosts are either internal or external to the network. If the hosts are external to the network, the cost of providing external servers increases because host administration must be maintained. In addition, the security risks increase because the external hosts are often not well managed. If the hosts are internal to the network, the internal hosts assume that they are protected by the network firewall even though they are still susceptible to internal attacks. Some internal hosts, on the other hand, have rigorous administrative processes but are commonly restricted by the network firewall, despite having strong host security.

Configuring information security policies is also difficult using these systems. For example, if a security policy is changed, all the design and implementations that were made for the previous applications and hosts of the enterprise network are invalidated and must be reconfigured. Also, if a new company is acquired by the enterprise, significant security policy changes must be implemented before the new applications and hosts can be brought into the internal network.

The internal, external, and DMZ architecture has many additional drawbacks. For example, if the company network has multiple external connections to the public Internet that are in different geographic locations, wide-area asymmetric routing to the public Internet is likely. That is, inbound and outbound data for a given connection will not pass through the same firewall device and therefore firewall policies that rely on inspection of the protocol state will fail, because the protocol state will reside in two different firewall devices. In Internet Protocol (IP) networks, technologies such as Network Address Translation (NAT) may be used to work around this problem, but these technologies do not address the underlying issue and often introduce problems in large or complex networks. Currently, no technology is generally available for synchronizing the protocol state between firewall devices in separate geographic locations.

In addition, this architecture is limited to having only one internal network, which exposes the company to great risks if an unauthorized user gains access to the internal network. This architecture also does not allow the company the option of segmenting risk. Hence, a risk taken by one host in the internal network is a risk taken indirectly by all the other hosts in the internal network. This becomes apparent when considering the above exception to the common network security policy. The risk to all the internal hosts is greatly increased for every host in the external network that is permitted access to the internal network via the network firewall or DMZ.

This architecture is further limited due to its difficulty in maintaining a uniform firewall policy for firewall devices that are across geographic locations and company units. Each firewall device has a combination of a number of diverse and complex rules that reflect the overall security policy and the specific exception cases required at that specific network control point. Each of these network control points represents a risk to the entire company. If there is a simple misconfiguration on any firewall device, the entire internal network is exposed to an unintended security breach or unwanted behavior. As the number of network control points increase, the likelihood of security exposure increases dramatically.

These limitations described above for the various network security architectures apply to networks of any size, but become more severe when considering large or highly distributed networks. A Network Service Provider (NSP), Internet Service Provider (ISP), Application Service Provider (ASP), E-Service Provider (ESP), or a large enterprise may have over 100 network control points around the world where a network security policy must be administered. Using the network architectures described above, it is almost impossible to ensure that the policies are consistent and error-free at each of the network control points.

Another drawback for large enterprises or service providers with firewalls at the network control points is that the network security policy governing any given hosts must be configured consistently at all the O(n) firewalls, where n is the number of network control points for the enterprise. This creates a lot of redundant work and greatly increases the likelihood of error in configuration. Also, this can lead to a lack of direct accountability for the network security policy. To determine the network security policy for any given host, the network security policy must be examined at every network control point across the enterprise. The network security policy implemented at network control points that are topologically distant from the host have an equal role in determining the enterprise network security policy for that host.

Therefore, it should be appreciated that there is a need for systems and methods that overcome the above drawbacks and limitations. The present invention fulfills this need as well as others.

SUMMARY OF THE INVENTION

A method of creating a structured access list template, which includes dividing an access list template into a plurality of sections, where each section includes rules that implement a function, creating an inbound local rule group for the bubble, creating an outbound local rule group for the bubble, creating an inbound remote rule group for the bubble, and creating an outbound remote rule group for the bubble.

A method of creating a uniform network security policy, which includes determining the number of levels of host security policy for the network, determining the number of levels of network security policies for the network, determining a minimum standard for each level of host security policy and network security policy, and assigning each of the plurality of bubbles a host level and a network level that satisfies the minimum standard.

A method of creating an access list for each of the plurality of bubble boundary devices, which includes creating an address table that includes a plurality of addresses corresponding to devices in a bubble partition, creating a protocol table that includes a list of network services and whether each of the network services are granted or denied access to the bubble partition, creating an access list template using the address table and the protocol table, using the bubble registry, generating an access list from the access list template, and providing the access list to one of the plurality of bubble boundary devices.

BRIEF DESCRIPTION OF THE DRAWINGS

Embodiments of the present invention will now be described, by way of example only, with reference to the following drawings in which.

DESCRIPTION OF THE PREFERRED EMBODIMENT

In this patent, the present invention is described in detail with regard to the drawing figures briefly described below. Similar labels and numbers on one drawing figure may represent the same element on other drawing figures. As such, the following terms are used throughout the patent. For purposes of construction, such terms shall have the following meanings:

The term "black list," unless otherwise specified, is intended to refer to a list of addresses corresponding to hosts that are to be restricted from accessing any resources in the network security system.

The term "bubble," unless otherwise specified, is intended to refer to two or more devices that have unrestricted network access with each other, share one or more network address ranges, and share a common network security policy defined by a matrix cell. Each bubble is made up of at least one bubble partition. Each bubble is a member of only one bubble type. Bubbles may be identified using a bubble type, a separator, and an identifier. For example, the second bubble of the web farm type can be identified using the WF.2 nomenclature.

The term "bubble boundary," unless otherwise specified, is intended to refer to one or more devices in a network control point that connects to one or more bubble partitions, and enforces the network security policy for the bubble.

The term "bubble partition," unless otherwise specified, is intended to refer to network devices within a bubble that connect to at least one network control point. Each bubble partition of a bubble implements a network security policy as provided by the matrix cell. All network devices in a bubble partition have unlimited network connectivity to all other network devices in other bubble partitions of the same bubble type. Bubble partitions may be identified using the bubble identifier and a range of network addresses. An example of an IP network bubble partition identifier is WF.2.10.8.8.0/24. The network address range defines the address range from 10.8.8.0 through 10.8.8.255 (the /24 represents a subnet, network, or supernet bit mask).

The term "bubble registry," unless otherwise specified, is intended to refer to a list or table of information that might include a description of the enterprises network security policy, the network firewall rule configuration, the business and operational processes associated with the administration of the network security policy.

The term "bubble type," unless otherwise specified, is intended to refer to one or more bubbles that have a host and network security defined by a matrix cell. All bubbles that belong to a particular bubble type share the same network security policy. Each bubble type may be owned by a different enterprise.

The term "host," unless otherwise specified, is intended to refer to a device that belongs to a particular bubble and can be identified using one or more network addresses. Each host adheres to the network security policy as defined by its bubble's matrix cell. A host is typically identified by a network address. For example, an IP network host address is 10.8.8.1.

The term "inter-bubble device," unless otherwise specified, is intended to refer to a device with one or more network interfaces that is simultaneously a member of more than one bubble, but is not part of a network control point. Inter-bubble devices must enforce the network security policy for each of the bubbles of which they are members.

The term "known bubble," unless otherwise specified, is intended to refer to all bubbles with known network security policies and source integrity.

The term "matrix cell," unless otherwise specified, is intended to refer to a cell at the intersection of a specific level of host security and a specific level of network security. Matrix cells are typically identified by the two names that define the host and network security. For example, a matrix cell can be identified by "low host security and high network security."

The terms "network access policy" and "network security policy," unless otherwise specified, are intended to refer to one or more rules or criteria that govern the movement of data across a bubble boundary.

The term "network control point," unless otherwise specified, is intended to refer to a physically co-located collection of one or more devices that perform one or more of the following functions: interconnect bubble partitions, interconnect network control point devices, interconnect network control points, and/or enforce a network security policy.

The term "network device," unless otherwise specified, is intended to refer to a device connected to a network. The device can be, e.g., a host, client, server, workstation, desktop, laptop, printer, router, and switch.

The term "owner," unless otherwise specified, is intended to refer to an entity, person, or organization that is authorized by the enterprise to create, edit, or remove policies relating to a portion of the network security system.

The term "unknown bubble," unless otherwise specified, is intended to refer to all networks and devices that are not part of any known bubble. Unknown bubbles fit into the lower left matrix cell of the bubble policy matrix. In an IP network, the unknown bubble includes the hosts and networks in the public Internet or private networks that are not part of known bubbles. In as much as they are unknown, no assumptions can be made with regard to connectivity between devices in the unknown bubble, nor can source integrity be assumed. There may be multiple unknown bubbles, each with one or more bubble partitions. Each unknown bubble partition can connect to multiple network control points (NCPs).

Figure 1:
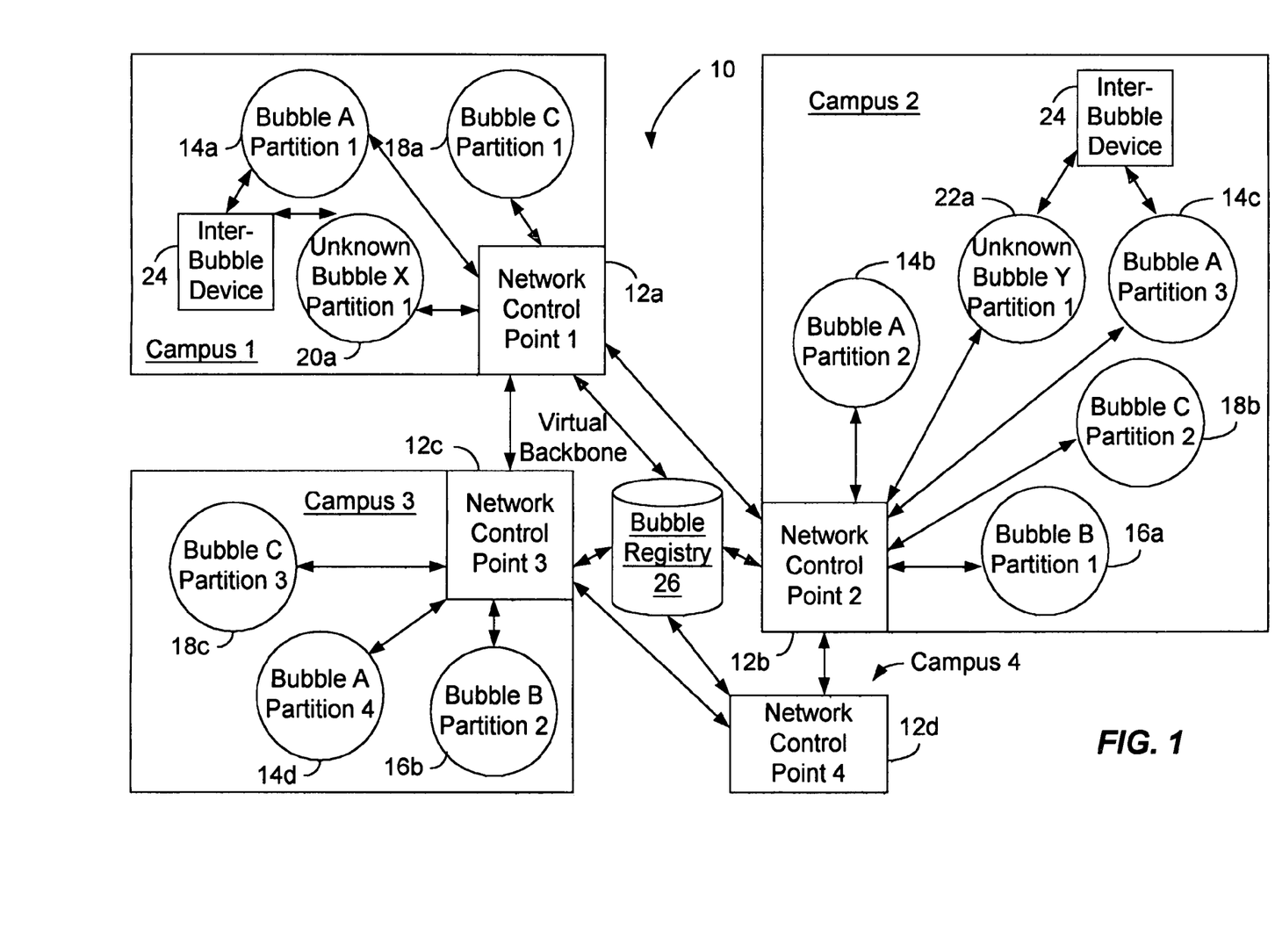
FIG. 1 is a simplified block diagram illustrating four different real or virtual locations utilizing a network security system.

With reference now to the illustrative drawings, and particularly to FIG. 1, there is shown a simplified block diagram illustrating four different real or virtual locations utilizing a network security system 10. Campus 1, 2, 3, and 4 can be organized as four separate real or virtual locations or one location having four separate regions. Each campus is connected to one another via a network control point 12. The network created by the interconnection of network control points forms a virtual backbone, which is a special network bubble type. FIG. 1 demonstrates that relatively complex networks can be constructed across separate locations each implementing a consistent network security policy. Each network bubble may be controlled or owned by a different part of an enterprise.

The network security system 10 has network control points 12, bubbles 14, 16, and 18, unknown bubbles 20, 22, inter-bubble devices 24, and a bubble registry 26. Each network control point has at least one network control point device, which is used to route data and/or enforce a network security policy. When a network control point device serves to enforce a particular network security policy, the network control point device might also be referred to as a bubble boundary device. Each bubble includes one or more bubble partitions.

In the case of an IP network, bubble partitions are defined by address ranges corresponding to one or more devices. In IP networks, address ranges are defined by a base address and a mask applied to the address to determine if an address is included in the range. Alternatively, bubble partitions may be defined by the placement of a network access point, which allows the network security system to be used with wireless networks. Other factors can be applied to distinguish bubbles based on the underlying network technology used.

In the case of an IP network, any host or network device having a network address within the address ranges for a given network bubble partition is described as being a member of that network bubble. Members of a network bubble have full network connectivity to all other members of the bubble, even if they are members of different partitions within the same bubble. For example, a host in bubble partition 14a has full network connectivity to all hosts in bubble partition 14b, 14c, and 14d.

Each bubble can be a known bubble 14, 16, 18 or an unknown bubble 20, 22. The unknown bubble might represent the public Internet or a private network about which no security assumptions can be made. A device in the unknown bubble might or might not be able to access other devices that are located in the unknown bubble. Moreover, a device in the unknown bubble might or might not be able to access data from a device in a known bubble. Whether a device in an unknown bubble can access data from another device in a known bubble depends on the network security policy of the known bubble as enforced by a network control point device (i.e., bubble boundary).

The network security system 10 might also include an inter-bubble device 24 that connects two or more bubbles to one another. The inter-bubble device is typically used in a situation where it is desirable to move data between bubbles, or access resources from more than one bubble, or provide resources to more than one bubble without going through a network control point. The inter-bubble device differs from the network control point in that it principally exists to expedite the movement of data for select purposes. Hence, inter-bubble devices must include capabilities to enforce network security policies. The inter-bubble device provides a local connection between two or more bubble partitions, e.g., 14*a*, 20*a*, so that data can be processed with reduced network latency resulting in increased throughput. The inter-bubble device and the network control point device implement the same network security policy with regards to bubbles 14*a* and 20*a*. Information relating to each bubble is typically stored in the bubble registry 26.

Figure 2:
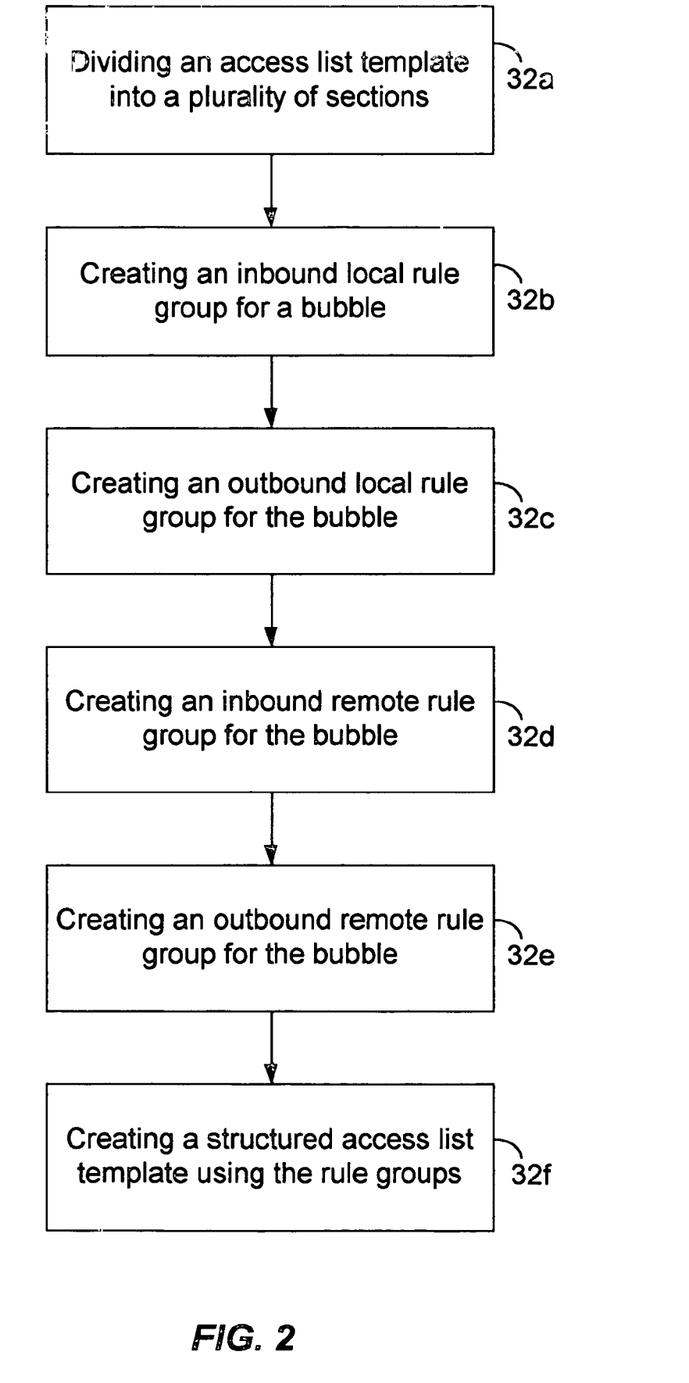
FIG. 2 is a simplified flow chart illustrating a method of creating a structured access list template.

FIG. 2 is a simplified flow chart illustrating a method of creating a structured access list template. Each bubble includes a structured access list template. Each bubble partition includes its own access list according to the structured access list template for the bubble. The access list includes rules that define the access permitted by the bubble owner. Access lists may be arranged or divided into sections, where each section of the access list includes rules that perform a specific function (step 32*a*). In the preferred embodiment, each bubble partition includes two access lists, one for inbound rules and the other for outbound rules. Alternatively, each bubble might have one structured access list template divided into four rule groups or sections, which are inbound local rule group, outbound local rule group, inbound remote rule group, and outbound remote rule group. The purpose of the rule groups is to allow a bubble owner to completely specify and control the policies for the bubble across the network control points, and to ensure the consistency in the implementation of the network security policy of the bubble in different network control points. Finally, access list templates and access lists are designed to express network security policies that are enforced on data processed by bubble boundary devices.

Each rule group references an address table, for example, in an IP network:

| Reference | Description | Subnet IP | Subnet Mask | Comment |
|---|---|---|---|---|
| World | The whole of Internet | 0.0.0.0 | 0.0.0.0 | The whole of Internet |
| Net 10 | Net 10 | 10.0.0.0 | 255.0.0.0 | Net 10 |
| DNS | DNS, NTP, DHCP Infrastructure | 10.1.0.0 | 255.255.0.0 | class B size /16 |

| Reference | Description | Protocol | Operator | Port | Flag | Comment |
|---|---|---|---|---|---|---|
| DNS | DNS, DHCP, NT | bootpc (client) | | | | |
| DNS | DNS, DHCP, NTP | bootps (server) | | | | |
| DNS | DNS, DHCP, NTP | domain | | | | |
| DNS | DNS, DHCP, NTP | ntp | | | | |
| Tracing | Ping ICMP tracing | echo-reply | | | | |
| Tracing | Ping ICMP tracing | echo-request | | | | |
| Tracing | Ping ICMP tracing | time exceeded | | | | |
| Ip | | ip | | | | |
| Icmp | | icmp | | | | |
| Esp | | ipsec | | | | |
| Udp | | udp | | | | |
| udp high range | | udp | gt | 1023 | | |
| Tcp | | tcp | | | | |
| tcp high range | | tcp | gt | 1023 | | |
| echo-reply | | icmp | eq | 0 | | |
| echo-request | | icmp | eq | 8 | | |
| time exceeded | | icmp | eq | 11 | | |
| dest unreach | | icmp | eq | 3 | | |
| Unassigned | Unassigned in IANA | tcp | eq | 6 | | |
| Unassigned | Unassigned in IANA | udp | eq | 6 | | |
| Ssh | | udp | eq | 22 | | |
| Ssh | | tcp | eq | 22 | | |
| Openssh | version 2.5.2 | tcp | eq | 22 | | |
| telnet | | tcp | eq | 23 | | |
| Smtp | | tcp | eq | 25 | | |
| Smtp | | udp | eq | 25 | | |
| Domain | | tcp | eq | 53 | | |
| Domain | | udp | eq | 53 | | |
| tacacs-ds | | tcp | eq | 65 | | |
| tacacs-ds | | udp | eq | 65 | | |
| bootps (server) | | tcp | eq | 67 | | |
| bootps (server) | | udp | eq | 67 | | |
| bootpc (client) | | tcp | eq | 68 | | |
| bootpc (client) | | udp | eq | 68 | | |

The inbound local rule group includes rules that enforce the access control on what data are allowed to enter the bubble partition. At step 32b, the inbound local rule group is created for the bubble. For example, in an IP network:

| Section | Desc | Cmnd | Protocol ref | Src: IP | Mask | Dest: IP | Mask |
|---|---|---|---|---|---|---|---|
| #Instance_Space | | | DNS | | | | |
| Local Incoming | | ACCEPT | ANTISPOOF_default | | | | |
| Local Incoming | | ACCEPT | MEMBERSHIP_default | | | | |
| Local Incoming | | permit | DNS | Net10 | | World | |
| Local Incoming | | permit | Tracing | Net10 | | World | |

The outbound local rule group includes rules that enforce the access control on what data are allowed to exit the bubble partition. At step 32c, the outbound local rule group is created for the bubble. For example, in an IP network:

| Section | Desc | Cmnd | Protocol ref | Src: IP | Mask | Dest: IP | Mask |
|---|---|---|---|---|---|---|---|
| #Instance_Space | | | DNS | | | | |
| Local Outgoing | | ACCEPT | MEMBERSHIP_default | | | | |
| Local Outgoing | | permit | Tcp | Local | | World | |
| Local Outgoing | | permit | Udp | Local | | World | |
| Local Outgoing | | permit | Icmp | Local | | World | |
| Local Outgoing | | ACCEPT | ANTISPOOF_default | | | | |

The inbound remote rule group includes rules that enforce inbound local rules on other bubble boundaries which import this access list template to ensure consistency in implementation of network security policies between bubbles. At step 32d, the inbound remote rule group is created for the bubble. For example, in an IP network:

| Section | Desc | Cmnd | Protocol ref | Src: IP | Mask | Dest: IP | Mask |
|---|---|---|---|---|---|---|---|
| #Instance_Space | | | DNS | | | | |
| Remote Incoming | | permit | Tcp highrange | DNS | | World | |
| Remote Incoming | | permit | Udp highrange | DNS | | World | |

The outbound remote rule group includes rules that enforce outbound local rules on other bubble boundaries, which import this access list template to ensure consistency in implementation of network security policies between bubbles. At step 32e, the outbound remote rule group is created for the bubble. For example, in an IP network:

| Section | Desc | Cmnd | Protocol ref | Src: IP | Mask | Dest: IP | Mask |
|---|---|---|---|---|---|---|---|
| #Instance_Space | | | DNS | | | | |
| Remote Outgoing | | permit | DNS | Local | | World | |

At step 32f, using the above rule groups, a structured access list template is created. For example, in an IP network:

The inbound access list:
1. action=deny protocol=ip
   source=10.1.1.0 source_mask=255.255.255.0
   destination=0.0.0.0 destination_mask=0.0.0.0

2. action=permit protocol=ip
   source=10.1.0.0 source_mask=255.255.0.0
3. action=permit protocol=tcp operator=eq destination_port=68
   source=10.0.0.0 source_mask=255.0.0.0
   destination=0.0.0.0 destination_mask=0.0.0.0
4. action=permit protocol=udp operator=eq destination_port=68
   source=10.0.0.0 source_mask=255.0.0.0
   destination=0.0.0.0 destination_mask=0.0.0.0
5. action=permit protocol=tcp operator=eq destination_port=67
   source=10.0.0.0 source_mask=255.0.0.0
   destination=0.0.0.0 destination_mask=0.0.0.0

6. action=permit protocol=udp operator=eq destination_port=67
source=10.0.0.0 source_mask=255.0.0.0
destination=0.0.0.0 0.0.0.0
7. action=permit protocol=tcp operator=eq destination_port=53
source=10.0.0.0 source_mask=255.0.0.0
destination=0.0.0.0 destination mask=0.0.0.0
8. action=permit protocol=udp operator=eq destination_port 53
source=10.0.0.0 source_mask=255.0.0.0
destination=0.0.0.0 destination_mask=0.0.0.0
9. action=permit protocol=tcp operator=eq destination_port 123
source=10.0.0.0 source_mask=255.0.0.0
destination=0.0.0.0 destination_mask=0.0.0.0
10. action=permit protocol=udp operator=eq destination_port=123
source=10.0.0.0 source_mask=255.0.0.0
destination=0.0.0.0 destination$_{13}$ mask=0.0.0.0
11. action=permit protocol=icmp type=0
source=10.0.0.0 source_mask=255.0.0.0
destination=0.0.0.0 destination_mask=0.0.0.0
12. action=permit protocol=icmp type=8
source=10.0.0.0 source_mask=255.0.0.0
destination=0.0.0.0 destination mask=0.0.0.0
13. action=permit protocol=icmp type=11
source=10.0.0.0 source_mask=255.0.0.0
destination=0.0.0.0 destination_mask=0.0.0.0
14. action=permit protocol=icmp type=3
source=10.0.0.0 source_mask=255.0.0.0
destination=0.0.0.0 destination_mask=0.0.0.0

The outbound access list:
1. action=permit protocol=ip
source=10.1.0.0 source_mask=255.255.0.0
2. action=permit protocol=tcp
source=10.1.1.0 source_mask=255.255.255.0
destination=0.0.0.0 destination_mask=0.0.0.0
3. action=permit protocol=udp
source=10.1.1.0 source_mask=255.255.255.0
destination=0.0.0.0 destination_mask=0.0.0.0
4. action=permit protocol=icmp
source=10.1.1.0 source_mask=255.255.255.0
destination=0.0.0.0 destination_mask=0.0.0.0
5. action=deny protocol=ip
source=0.0.0.0 source_mask=0.0.0.0
destination=0.0.0.0 destination_mask=0.0.0.0

Although the description and example is specific to an IP network, a bubble network, and bubble boundary devices, the method of creating a structured access list template can apply to any network and any form of network access control list and any network firewall.

Figure 3:
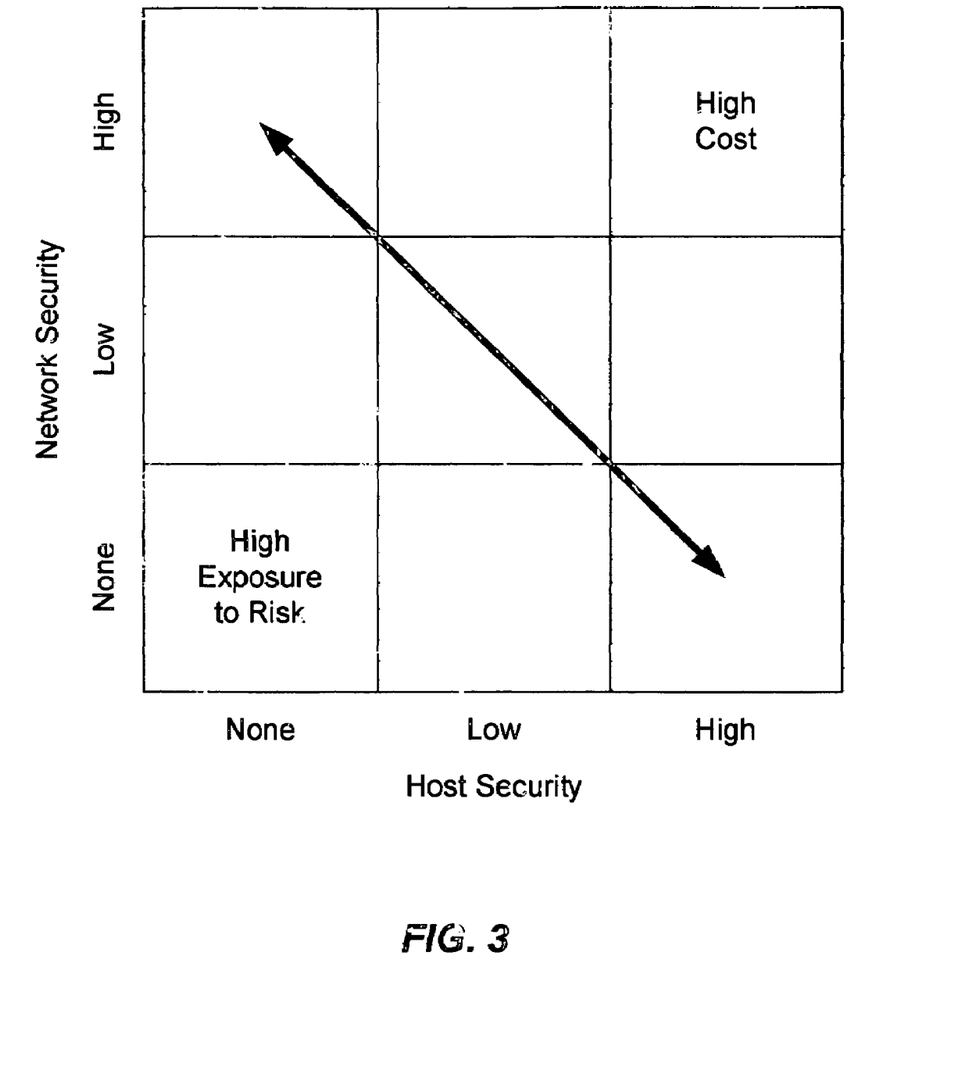
FIG. 3 is a graphical representation of a bubble policy matrix, which depicts the relationship between classes or levels of security effort/risk mitigation costs for both host based and network based security measures.

FIG. 3 is a graphical representation of a bubble policy matrix, which depicts the relationship between classes or levels of security effort/risk mitigation costs for both host based and network based security measures. Typically an enterprise utilizing the bubble policy matrix has at least two different host security policies and at least two protected networks or network bubbles with different network security policies. The bubble policy matrix can have any number of columns and rows depending on the complexity and implementation of the network security system. For example, an enterprise might set the number of columns and rows to balance granularity of control with complexity and cost of implementing the network security system.

Figure 4:
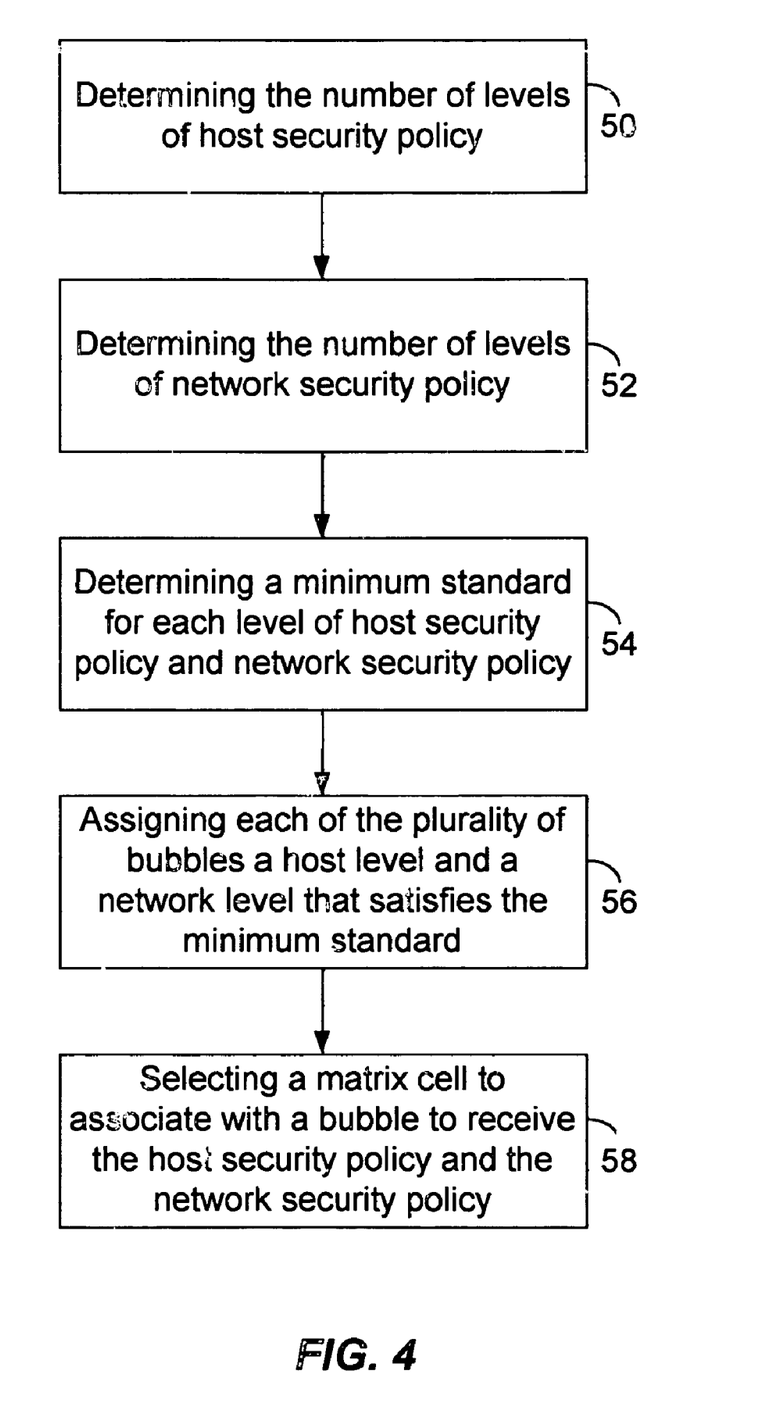
FIG. 4 is a simplified flow chart illustrating a method of creating a uniform network security policy.

FIG. 4 is a simplified flow chart illustrating a method of creating a uniform network security policy. The bubble policy matrix allows an enterprise to create a uniform network security policy. That is, each enterprise needs to determine the number of levels of host security policy and network security policy (steps 50 and 52). Once the policies are defined, each bubble can be represented by a matrix cell. Using the bubble policy matrix, a network administrator of the enterprise typically determines the minimum standard for each level of host and network security (step 54). The standard for each level might be unique to the enterprise and might use existing tools and processes for the host and network security. Each bubble is assigned a host and network security level of host and network security that meets or exceeds the minimum standard for the enterprise (step 56). The bubbles are assigned the host level according to the host security assigned and enforced at the least secure host for a particular bubble and the network security level according to the network security assigned and enforced at the least secure firewall or bubble boundary. Once the host and network security levels are assigned, the bubbles can be configured for new host implementations, application hosting, information handling and storage, and network access to other bubbles. In addition, a matrix cell can be selected to receive the host security policy and the network security policy (step 58).

The network administrator is typically granted or denied access to the resources at the bubble boundaries. The bubble owner determines whether the network administrator is granted or denied access to the bubbles. Bubbles that implement strong personal authentication at the bubble boundaries generally deny access to all unknown personnel and all known personnel to whom specific authorization for access has not been granted. The network administrator is identified to the bubble model by whatever means or labels used by the network security system. For example, the labels may include the name, login identification, employee number, certification number, etc.

Figure 5:
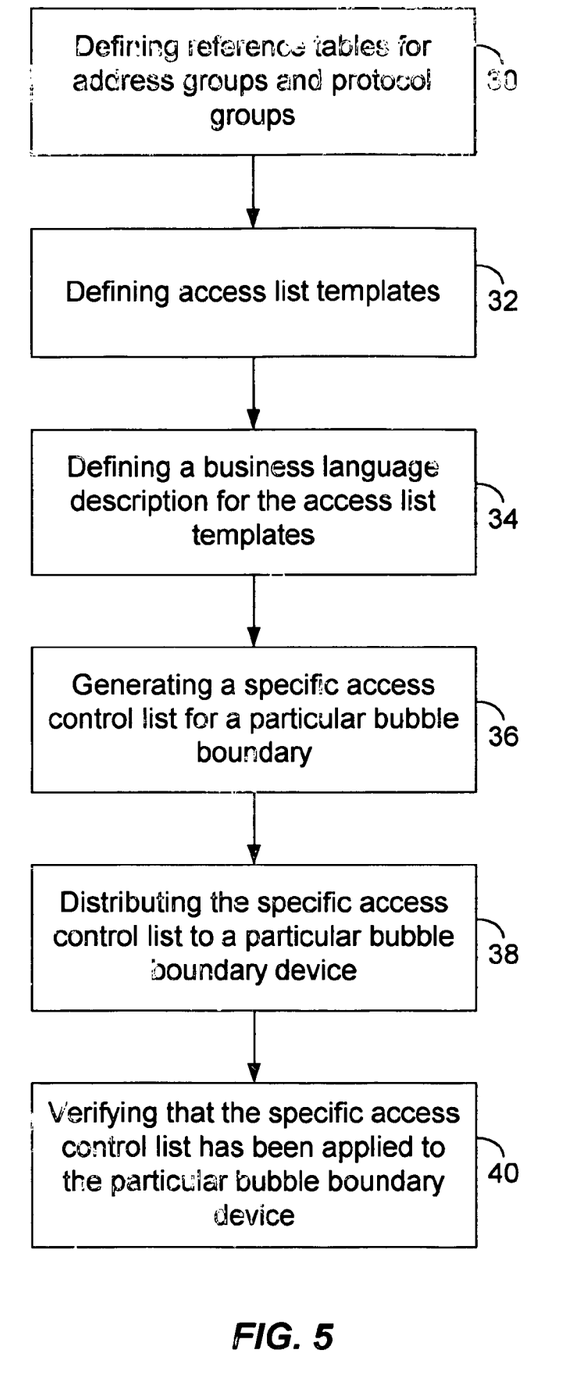
FIG. 5 is a simplified flow chart illustrating a method of configuration and maintaining the bubble registry of FIG. 1.

FIG. 5 is a simplified flow chart illustrating a method of configuring and maintaining the bubble registry 26 of FIG. 1. A network security system administrator creates address tables that describe address groups of the network security system and protocol tables that describe protocols groups which are granted or denied access to portions of the network security system. The address table also contains a special group which is typically outside the address ranges of the network security system, but could also include address ranges inside the network security system. This group is called the "black list group". This is the address group of IP addresses which are not allowed to send any data across the virtual backbone. This black list group is maintained to control the risk of exposure to malicious hosts, e.g., hosts involved in the denial of services attacks.

The structured access list templates described in FIG. 2 is created by reference to the address table and protocol table. The structured access list template is augmented with the business language descriptions of the access which is granted by the access list template. The business language descriptions and business-related information are stored in the bubble registry.

The business language descriptions are human readable text that provide a description of the structured access list template. The business-related information includes the business and operational processes associated with the proper administration of the network security policy. For example, the business-related information might include the name of the policy owner, the date the policy was last reviewed, and the date the policy expires.

The bubble registry 26 stores the network address ranges for each of the bubbles, stores the bubble access list template, stores the network bubble boundary device access list, and distributes the network bubble boundary device access lists to the network bubble boundary devices. The distribution may be directly to the network bubble boundary device, or it may be indirectly through a device management system, which in turn applies the specific structured access list to the device. To distribute or retrieve the network bubble boundary device access lists, a push or a pull technique can be implemented. In the push technique, the bubble registry loads the network bubble boundary device access list onto the network bubble boundary devices, or load the network bubble boundary device access-lists into the device configuration management system which in turn pushes the network bubble boundary device access list into the network bubble boundary device. In the pull technique, the network bubble boundary device configuration management system periodically polls the bubble registry for the latest network bubble boundary device access lists. The bubble registry also updates an audit log, which stores the network bubble boundary device access list provided to each network bubble boundary device and the time it was provided. The bubble registry can also generate a report for printing and viewing by a user. The report might be used to review and modify security policies, business projects, bubble types, bubble boundary devices, and ranges of address ranges.

In addition, the bubble registry may periodically validate that the correct structured access list is in place on the specific bubble boundary device for which it is intended. Any discrepancies would be logged and an event would be created to take action. Either the administrator of the network security system is alerted or the bubble registry automatically distributes the correct structured access-list to the device. Also, changes to the address tables, protocol tables, and structured access-list template, may require the bubble registry to re-generate a specific structured access list for some network boundary devices. Depending on the nature of the change, it may affect one network boundary device or it may affect all network boundary devices.

Although the description and example is specific to a bubble network, structured access lists, and bubble boundary devices, the bubble registry can also be applied to any network, any access lists and any network firewall devices.

The foregoing detailed description of the present invention is provided for the purposes of illustration and is not intended to be exhaustive or to limit the invention to the precise embodiment disclosed. Several embodiments of the network security system have been described that are provided for the purposes of illustration and are not intended to be exhaustive or to limit the invention to the precise embodiment disclosed. The embodiments may provide different capabilities and benefits depending on the configuration used to implement the network security system. Accordingly, the scope of the present invention is defined by the following claims.

What is claimed is:

1. In a network security system having a plurality of bubbles, where each bubble has a plurality of bubble partitions, a method of creating a structured access list template, the method comprising:
   dividing a first access list template into a plurality of sections, where each section includes rules that implement a function;
   assigning a first plurality of network devices to a first bubble;
   assigning a second plurality of network devices to a second bubble;
   creating an inbound local rule group for the first bubble;
   creating an outbound local rule group for the first bubble;
   creating an inbound remote rule group for the first bubble for use by the second bubble for allowing access from the first plurality of network devices of the first bubble;
   creating an outbound remote rule group for the first bubble for use by the second bubble for allowing access to the plurality of network devices of the first bubble;
   arranging the inbound local rule group and the outbound local rule group in one of the plurality of sections of the first access list template; and
   arranging the inbound remote rule group and the outbound remote rule group in one of the plurality of sections of the first access list template.

2. A method as defined in claim 1, further comprising arranging the inbound remote rule group and the outbound remote rule group from another bubble access list template in the first access list template.

3. A method as defined in claim 1, further comprising dividing a second access list template into a plurality of sections, where each section includes rules that implement a function.

4. A method as defined in claim 3, further comprising arranging the inbound local rule group and the outbound local rule group in the second access list template.

5. A method as defined in claim 3, further comprising arranging the inbound remote rule group and the outbound remote rule group from another bubble access list template in the second access list template.

6. A method of creating a structured network for providing security comprising:
   assigning a first plurality of network devices to a first bubble;
   assigning a second plurality of network devices to a second bubble;
   providing a first access list template having a plurality of sections, where each section includes rules that implement a function;
   providing an inbound local rule group for the first bubble;
   providing an outbound local rule group for the first bubble;
   providing an inbound remote rule group for the first bubble for use by the second bubble for allowing access from the first plurality of network devices of the first bubble;
   providing an outbound remote rule group for the first bubble for use by the second bubble for allowing access to the first plurality of network devices of the first bubble;
   arranging the inbound local rule group and the outbound local rule group in one of the plurality of sections of the first access list template;
   arranging the inbound remote rule group and the outbound remote rule group in one of the plurality of sections of the first access list template; and
   utilizing the first access list template to ensure consistency in implementation of network security policies between the first bubble and the second bubble.

7. A method as defined in claim 6, further comprising arranging the inbound remote rule group and the outbound remote rule group from another bubble access list template in the first access list template.

8. A method as defined in claim 6, further comprising providing a second access list template having a plurality of sections, where each section includes rules that implement a function.

9. A method as defined in claim 8, further comprising arranging the inbound local rule group and the outbound local rule group in the second access list template.

10. A method as defined in claim 8, further comprising arranging the inbound remote rule group and the outbound remote rule group from another bubble access list template in the second access list template.

* * * * *

UNITED STATES PATENT AND TRADEMARK OFFICE
CERTIFICATE OF CORRECTION

PATENT NO. : 7,376,965 B2  Page 1 of 1
APPLICATION NO. : 09/861986
DATED : May 20, 2008
INVENTOR(S) : Brian Jemes et al.

It is certified that error appears in the above-identified patent and that said Letters Patent is hereby corrected as shown below:

In column 11, line 4, delete "destination=0.0.0.0 0.0.0.0" and insert
-- destination=0.0.0.0 destination_mask 0.0.0.0 --, therefor.

In column 11, line 8, delete "destination mask" and insert
-- destination_mask --, therefor.

In column 11, line 9, after "destination_port" insert -- = --.

In column 11, line 13, after "destination_port" insert -- = --.

In column 11, line 20, delete "destination$_{13}$ mask" and insert
-- destination_mask --, therefor.

In column 11, line 26, delete "destination mask" and insert
-- destination_mask --, therefor.

In column 14, line 11, in Claim 1, insert -- first -- before "plurality".

Signed and Sealed this

Twenty-ninth Day of July, 2008

JON W. DUDAS
*Director of the United States Patent and Trademark Office*